US007958000B2

(12) United States Patent
Luby et al.

(10) Patent No.: US 7,958,000 B2
(45) Date of Patent: *Jun. 7, 2011

(54) METHOD AND SYSTEM FOR ANALYZING THE EFFECTIVENESS OF MARKETING STRATEGIES

(75) Inventors: Michael J. Luby, Bryn Mawr, PA (US); Patrick J. Howie, Maple Glen, PA (US); Braden C. Parker, Wayne, PA (US); Jeffrey A. Kozloff, North Wales, PA (US); Jason T. Crook, Philadelphia, PA (US); Daniel J. Cohen, Philadelphia, PA (US); Adam R. Priest, Glenside, PA (US)

(73) Assignee: TargetRX, Inc., Horsham, PA (US)

( * ) Notice: Subject to any disclaimer, the term of this patent is extended or adjusted under 35 U.S.C. 154(b) by 1318 days.

This patent is subject to a terminal disclaimer.

(21) Appl. No.: 11/442,459

(22) Filed: May 26, 2006

(65) Prior Publication Data

US 2006/0217057 A1 Sep. 28, 2006

Related U.S. Application Data

(62) Division of application No. 10/417,326, filed on Apr. 17, 2003, now Pat. No. 7,080,027.

(51) Int. Cl.
*G06F 17/30* (2006.01)

(52) U.S. Cl. ..................................... 705/7.32

(58) Field of Classification Search .................... 705/10, 705/7.32

See application file for complete search history.

(56) References Cited

U.S. PATENT DOCUMENTS

| | | | |
|---|---|---|---|
| 5,227,874 A * | 7/1993 | Von Kohorn | 705/7.32 |
| 6,286,005 B1 * | 9/2001 | Cannon | 455/2.01 |
| 6,708,156 B1 * | 3/2004 | Gonten | 705/7.31 |
| 6,772,129 B2 * | 8/2004 | Alvarez et al. | 705/14.41 |
| 6,970,830 B1 * | 11/2005 | Samra et al. | 705/7.28 |
| 7,080,027 B2 * | 7/2006 | Luby et al. | 705/7.31 |
| 2002/0042738 A1 * | 4/2002 | Srinivasan et al. | 705/14 |
| 2003/0004777 A1 * | 1/2003 | Phillips | 705/10 |
| 2003/0050825 A1 | 3/2003 | Gallivan et al. | |
| 2003/0061096 A1 * | 3/2003 | Gallivan et al. | 705/14 |
| 2003/0065555 A1 * | 4/2003 | von Gonten et al. | 705/10 |
| 2003/0088458 A1 * | 5/2003 | Afeyan et al. | 705/10 |
| 2003/0177055 A1 * | 9/2003 | Zimmerman et al. | 705/10 |
| 2004/0117239 A1 * | 6/2004 | Mittal et al. | 705/10 |
| 2005/0033627 A1 * | 2/2005 | Thieme et al. | 705/10 |
| 2006/0080136 A1 * | 4/2006 | Frank et al. | 705/1 |

OTHER PUBLICATIONS

TargetRX web site, archived at http://web.archive.org/web/*/http://www.targetrx.com on Jun. 26, 2001.*

* cited by examiner

*Primary Examiner* — Susanna M Diaz
(74) *Attorney, Agent, or Firm* — Wilmer Cutler Pickering Hale & Dorr LLP.

(57) ABSTRACT

A method and system for analyzing a "detail" (the use of promotional materials in combination with a sales pitch), measures the effectiveness of a sales presentation and its ability to drive market share through a standardized, quantitative evaluation of the entire sale presentation and its related components. The method includes administering a two, different surveys. The first survey, the Detail Performance Monitor survey, comprises an "in the field" test of how respondents are responding to various marketing strategies by tracking subsequent behavioral data of the respondents and comparing the behavioral data to the survey results. The second survey, the Detail Assessment survey, comprises an "in the lab" test of how various marketing strategies affect respondent attitude towards a product by comparing respondent attitude before and after presentation of a simulated "detail" that represents the marketing strategy.

24 Claims, 6 Drawing Sheets

PRESCRIBING FOR PATIENTS
--CHANGE IN PRESCRIBING [HIGH RISK / HIGH CHOLESTEROL] -

| | HIGH RISK / HIGH CHOLESTEROL PATIENTS | | | |
|---|---|---|---|---|
| | SPECIALIST | | PCP | |
| | Current [A] (n=100) | Post-detail [B] (n=100) | Current [A] (n=100) | Post-detail [B] (n=100) |
| PRODUCT 1 | 15.2 | 28.3[A] | 12.1 | 30.3[B] |
| PRODUCT 2 | 19.2 | 15.5 | 17.4[A] | 13.0 |
| PRODUCT 3 | 15.8[B] | 11.0 | 18.1[A] | 12.5 |
| PRODUCT 4 | 14.4 | 10.2 | 14.6 | 11.1 |
| PRODUCT 5 | 15.3 | 14.1 | 10.2 | 8.8 |
| PRODUCT 6 | 8.4 | 10.3 | 15.8 | 15.4 |
| OTHER (SPECIFY) | 11.6 | 10.6 | 11.9 | 9.0 |

PRESCRIBING FOR PATIENTS
--CHANGE IN PRESCRIBING [HIGH RISK / HIGH CHOLESTEROL]-

| | HIGH RISK / HIGH CHOLESTEROL PATIENTS | | | |
|---|---|---|---|---|
| | SPECIALIST | | PCP | |
| | Current [A] (n=100) | Post-detail [B] (n=100) | Current [A] (n=100) | Post-detail [B] (n=100) |
| PRODUCT 1 | 15.2 | 28.3[A] | 12.1 | 30.3[B] |
| PRODUCT 2 | 19.2 | 15.5 | 17.4[A] | 13.0 |
| PRODUCT 3 | 15.8[B] | 11.0 | 18.1[A] | 12.5 |
| PRODUCT 4 | 14.4 | 10.2 | 14.6 | 11.1 |
| PRODUCT 5 | 15.3 | 14.1 | 10.2 | 8.8 |
| PRODUCT 6 | 8.4 | 10.3 | 15.8 | 15.4 |
| OTHER (SPECIFY) | 11.6 | 10.6 | 11.9 | 9.0 |

FIG. 3

| | SPEC [A] (n=100) | PCP [B] (n=100) | NORM |
|---|---|---|---|
| STAYING POWER | 5.2 | 5.2 | 5.4 |
| ACCURATELY SUMMARIZES PERTINENT INFORMATION | 5.4 | 5.2 | 5.6 |
| LEAVES A LASTING IMPRESSION | 4.9 | 5.2 | 5.2 |
| EXECUTE METRICS | 5.2 | 5.4 | 5.6 |
| IS A STAND ALONE COMPREHENSIVE SOURCE OF PRODUCT INFORMATION | 4.9 | 5.4 | 5.0 |
| THE KEY MESSAGE IS EASILY IDENTIFIABLE | 5.6 | 5.3 | 5.6 |
| CREATIVE CONTENT METRICS | 5.2 | 5.2 | 5.4 |
| THE INFORMATION IN THE TEXT IS USEFUL | 5.4 | 5.4 | 5.5 |
| THE PHOTOS AND/OR IMAGES ARE APPROPRIATE | 5.3 | 4.9 | 5.2 |
| EMOTIONAL RESPONSE METRICS | 5.0 | 5.4 | 5.6 |
| IS BELIEVABLE | 5.1 | 5.5 | 5.4 |
| IS COMPELLING | 5.0 | 5.5 | 5.2 |
| IS PERSUASIVE | 4.9 | 5.3 | 5.3 |
| BRANDING METRICS | 5.4 | 5.0 | 5.6 |
| THE PRODUCT NAME OR LOGO IS PRESENTED IN A GOOD LOCATION | 5.5 | 5.1 | 5.4 |
| THE SIZE OF THE PRODUCT NAME OR LOGO IS OPTIMAL | 5.5 | 5.0 | 5.3 |
| THE MARKETER'S/MANUFACTURER'S NAME IS PRESENTED WELL | 5.3 | 4.9 | 5.2 |

FIG. 4

METHOD AND SYSTEM FOR ANALYZING THE EFFECTIVENESS OF MARKETING STRATEGIES

CROSS-REFERENCE TO RELATED APPLICATION

This application is a division of application Ser. No. 10/417,326 filed Apr. 17, 2003, which is incorporated herein by reference.

FIELD OF THE INVENTION

The present invention generally relates to analysis of marketing materials. More particularly, the present invention relates to a method and system for analyzing a "detail" (the use of promotional materials in combination with a sales pitch), using consistent measures to provide comparisons of effectiveness across industry and time and to predict success of the campaign in the marketplace.

BACKGROUND OF THE INVENTION

Pharmaceutical companies spend billions of dollars annually on one-to-one promotion of their products to physicians. The most common method is that of a sales representative calling on physicians' offices to engage them in product discussions with the use of carefully prepared promotional materials, known as a "detail" within the industry. Pharmaceutical companies devote considerable resources to creating and testing these materials and in preparing representatives to effectively use them. The total detail—promotional materials and voiceover—is not evaluated in a consistent manner such that findings may be compared across products and markets, and used to predict the impact of a detail on physician behavior and prescribing. As a result, companies do not isolate and promulgate best practices, nor can they fully assess the effectiveness of the campaign prior to field implementation.

Promotional materials are the items that sales representatives put in front of a customer during a detail to gain their attention, convey marketing messages, or prove a claimed benefit. When accompanied with the salesperson's commentary, the materials are designed to make the presentation more effective and more memorable, thereby increasing the likelihood that the customer will take the desired action. These materials may take a variety of forms, from a one page sell sheet or dosing reminder card to pamphlets, sample boxes, and clinical study reprints. Once created and approved, these materials may be used for weeks to several years. Effective approaches and methods may be extended to other product teams within the organization or revived years later.

In constructing the materials, marketers must strive to distill complex information into extremely concise messages that will influence physicians, and to do so within FDA guidelines. To effectively use the materials in a detail, they pull their sales forces from the field two to three times a year to explain the data and rehearse the voiceover. In testing the materials, marketing teams leave their core duties to travel to cities throughout the US for focus group and other qualitative testing.

Companies use a variety of methods to test detailing. This testing is designed to ensure that the promotional materials faithfully and effectively convey the brand's intended messaging, that the materials are accurate, intelligible and graphically appealing and that, ultimately, the total detail helps to position the brand in a way to increase usage. At present, this testing is predominately focused on the physical materials, although occasionally researchers will add a simulated sales pitch to the presentation of the materials to better simulate the selling environment.

Researchers make a series of methodologic choices that determine the ultimate validity of the findings and—by extension—the ability of the research to predict success of the campaign in the marketplace. The major methodologic components of marketing research include the type of interview, the sample, the survey instrument and the analysis, among other components.

The first decision for a researcher is the type of interview: qualitative or quantitative. At present, qualitative testing is the predominate method for testing details in the pharmaceutical industry, mainly due to tradition and the absence of other options. Each interview type has a role in marketing research; a brief discussion of the method, its limitations and broader applicability for promotion research follows.

Qualitative testing: When a subject is poorly understood or the researcher needs license to reactively delve into particular responses, qualitative research is preferred. An example of this technique is a fill-in-the-blank, or open-ended, question. This method can produce a deep, anecdotal understanding of the subject area among those who can physically witness the research; this understanding is accurate to the extent that other methodologic choices are adequately controlled. This form of research is conducted with a small number of respondents, either as one-on-one interviews or as part of a focus group. These interviews are typically conducted by a trained moderator who guides the participants through the materials and provokes a reaction. In qualitative testing, the respondent receives some guidance in allowable responses but is, for the most part, answering a series of open-ended questions.

Most often, these interactions are scripted in the form of a discussion guide, although the moderator may frequently deviate from this script to react to an individual respondent's opinions. The presence of the interviewer imparts a subtle bias on the results—it is instinctively more difficult to be negative in front of another person, even if the researcher disavows any connection with the marketer. Responses are captured in hand-written notes or video/audio taped for later transcription, and may be produced as a rough grouping of verbatim responses or as a list of those responses. Rarely, these results are coded into a quantitative report.

Qualitative testing places considerable limitations on the interpretation of results. With respect to the adequacy of the sample, qualitative testing of large groups is prohibitively expensive and time consuming. As a result, samples are typically too small to analyze by subgroup and too unrepresentative and geographically concentrated to reliably project the findings to the entire physician universe. With respect to analysis, qualitative findings are typically reported without quantification, as the relatively unstructured method of the interview produces anecdotal data not suited for quantitative analysis. In this way, qualitative testing is much like a conversation, and as such tends to deviate from interaction to interaction. Although the ability to analyze results across campaigns and across time is patently helpful to the marketer, the inherent nature of qualitative results data defy attempts to benchmark a campaign against others or to gain full value of the data over time.

Another limitation of qualitative results data is the need for a marketer to attend the research to gain full benefit. In essence, hearing third-party anecdotes from a conversation is markedly different, and less valuable, than hearing the entire conversation. Because of the absence of coherent results from free-form data, a failure to attend can effectively remove an absent marketer from understanding and influencing the process. This situation results in marketers abandoning their core duties to travel to multiple cities to "sit in on" the research. As a result, marketers are resigned to the travel—and resultant diminution of productivity around other efforts—multiple times per year.

Quantitative testing: when a research area is sufficiently understood and when the researcher has a need to analyze findings for significance, by subgroup or across surveys, quantitative testing is preferred. Examples of this technique include multiple-choice, ranking and rating questions. This form of research exposes respondents to a consistent questionnaire via mail, fax, in-person interview, and more recently, via the Internet. Non-network variants (mail, fax, non-networked computer terminals, and in-person) provide a form or other structured question set to be filled out by the respondent or, in the case of an in-person method, by an interviewer; online variants render the questionnaire as software via a web browser. Online variations further increase the illusion of anonymity, thereby prompting more candid—and accurate—responses.

Non-personal fielding methods eliminate the biasing effect of a moderator and reduce testing variability, where the questionnaire might change slightly in each deployment. Internet deployments also allow the research to control for other environmental conditions, such as time available to take the survey, the ability to "read ahead" or "back up" when taking the survey, etc. As compared to mail or fax method, this Internet method allows the researcher to more carefully control the experiment, again affording the opportunity for more accurate findings.

With quantitative methods, researchers may choose to test small groups or to test thousands of interactions. Larger samples produce higher statistical confidence around findings and the ability to analyze across more subgroups but cost more and take more time; the smallest sample that will produce statistical significance is generally regarded to be no less than 30-40 per subgroup. Sample size is determined by modeling the research instrument against the desired resolving power of the survey.

Responses are recorded in a form designed for subsequent statistical testing and analysis, and are typically processed into cross-tabulated reports and/or by graphs and charts. Quantitative testing produces a highly analyzable, trendable data set but can miss a more nuanced understanding of responses due to the relative inability to reactively—non-programmatically—drill into responses.

In considering the other methodologic components, quantitative testing provides the largest safety net with respect to determining the believability of the response set and applying the findings in the marketplace. A quantitative sample can be large enough to provide statistical testing of difference between subgroups and can be representative of the larger population so the findings of a small group may be reliably projected to the entire population. The sample can also be geographically representative, diminishing the danger of localized or regional effects.

Although quantitative research offers the promise of a more consistent stimulus—through strict control of the survey instrument and the methodology—a desire to meet the specific needs of the customer may lead a researcher to tailor his methods to the needs of an individual marketing team. A survey instrument may thus become a customized instrument for each customer. While this customization might be minor, such as the inclusion of Reason G into a list of Reasons for Prescribing A-F, this customization may be sufficient to produce incomparable data. In this example, a ranking of Reason G as the highest rated attribute is meaningless when compared against data from respondents who were not afforded the same response choice. In this way, minor customization of the survey instrument can produce sufficient variability in survey stimuli to preclude analysis of what are, in essence, responses to different questions. In this fashion, the customization inherent in prior art methods are used in the pharmaceutical industry contributes to the lack of performance benchmarks of promotional materials across the industry.

Regardless of the type of interview, a significant limitation of current offerings—both qualitative and quantitative—is in the scope of testing. A sales detail is comprised of two main components, the promotional materials and the accompanying sales pitch. Present techniques tend to test these components in isolation or test only the visual materials, severely limiting a marketer's ability to accurately gauge the effect of the total detail. It is the combination of promotional materials and the accompanying voiceover that produces the intended effect in the marketplace—to test either in isolation is to test for a selling environment that does not exist. Results from this testing may impart an inaccurate view of how the campaign will perform in the marketplace.

Lastly, current methods do not provide an analysis of the strengths and weaknesses of the detail against industry norms, nor do they attempt to project the ultimate success of the campaign. First, there are no norms to compare against; second, rarely—if ever—do current methods provide detail around which discrete components are most effective; third, few methods calibrate their attitudinal findings with actual behavioral data.

SUMMARY OF THE PRESENT INVENTION

The present invention provides marketers with a validated standardized technique that measures and quantifies the effectiveness of a sales presentation prior to campaign rollout. By testing the sales presentation with a representative sample of respondents (large and heterogeneous enough to be extrapolated to the respondent universe), companies can design and launch a more effective marketing campaign.

Specifically, in some aspects, this invention measures the effectiveness of a sales presentation and its ability to drive changes in behavior and market share. Through a standardized, quantitative evaluation of the entire sales presentation and its related components administered to respondents (such as via the Internet), this invention assists companies in identifying the elements of the presentation that both enhance and detract from its overall value. By providing a means to quantify the effect of the presentation on respondent consumer behavior, marketers can forecast campaign impact, allocate the proper resources to the campaign and minimize market risk factors associated with sales force implementation. Additionally, aspects of this invention provide companies with objective performance benchmarks and findings that provide marketers with measurable criteria to evaluate strategic go/no-go decisions.

The choice of quantitative fielding is another tenet of this solution. This method can yield a sufficient sample to ensure geographic representation and projectability to the larger population. Quantitative fielding also removes the variability of in-person testing; everyone sees the same quantitative questionnaire and multimedia sales presentation, regardless of when or where they are exposed to the research. Lastly, this invention removes the requirement for researchers to witness the data collection. The quality of quantitative reporting ensures that all participants gain the same value from the data. This in turn allows marketers to reduce travel and recapture lost productivity.

Using a standardized questionnaire is another aspect of this invention. Such a questionnaire provides consistency that allows comparison of each component of the sales presentation in a standardized, trendable fashion, for example: across time, products, companies, therapeutic areas, and even across disparate industries. It also allows researchers to scientifically pinpoint the contribution of minute aspects of the total detail to changes in behavior, and forms the basis for all normative comparisons, i.e., comparisons over time and in various circumstances. Maintaining standardization of these instruments—and avoiding the customization that represents current practice—is another feature offered by this invention.

The standardized methodology of the present invention provides companies with quantitative, actionable, and comparative research results not available anywhere else. Marketers, in turn, utilize and apply these findings in a number of ways, for example: measurement of expected impact on prescribing by patient type; validation of key messages and their support of the brand's positioning; identification and diagnostic evaluation of the strengths and weaknesses of the detail vs. industry norms (other tested details); and calculation of an overall score that measures relative detail effectiveness compared to other tested details and actual details in the marketplace.

The present invention is described herein as having particular use with regard to marketing strategies in the pharmaceutical industry, with materials directed to physicians or other prescribing practitioners, typically to encourage them to prescribe a company's products. However, it should be noted that the present invention is not limited to this use and may be applied to any area in which marketing strategies are utilized and, thus, are desired to be evaluated, especially where subsequent behavior can be quantified.

It is one feature and advantage of the present invention to offer a consistent methodology, which provides an ability to analyze success across time and across markets—questions, survey logic and flow are consistent across campaigns and eliminate in-person testing variability.

Another feature and advantage of the present invention offers rigorous pre and post-exposure question batteries that provide a well-defined measure of change in attitudes as a result of exposure to a detail.

Another feature and advantage of the present invention offers multimedia technology that affords the ability to view an entire presentation and drill down to particular sub-areas for emphasis and provides the ability to add a recorded voiceover that simulates the representative sales pitch, thereby better approximating the actual environment in which it will be used.

Another feature and advantage of the present invention offers analysis that produces a "detail performance score", providing a top-level metric for the comparison of campaigns and predicting future changes in market share.

Another feature and advantage of the present invention offers a method of calibrating attitudinal data about promotional materials with actual prescribing behavior and assess expected impact on prescribing, weeks or months before the prescribing is reported.

Another feature and advantage of the present invention is to produce a normative dataset of responses to promotional materials, and to compare performance of a campaign against a normative dataset of previous campaigns to provide decision support context.

Another feature and advantage of the present invention is to use a geographically representative sample.

Another feature and advantage of the present invention is to reduce "out of office" time for research participants and offering more convenience for respondents by enabling respondents to take via Internet from the comfort of their home.

Another feature and advantage of the present invention provides a thorough diagnostic evaluation of the strengths and weaknesses of the detail and produces statistically significant measures of reactions to detail components.

Another feature and advantage of the present invention provides a "counter-detail" option to simulate a competitive representative's "debunking" of the presentation and consequent impact on receptivity to the materials.

There has thus been outlined, rather broadly, a number of features of embodiments of the invention and several, but not all, embodiments in order that the detailed description thereof that follows may be better understood, and in order that the present contribution to the art may be better appreciated. Other features of the invention that will be apparent from the description and drawings hereinafter although the invention, as defined by the claims appended hereto, may not include all or even many of the features indicated. In addition, aspects and portions of the invention may be the subject of claims.

BRIEF DESCRIPTION OF THE DRAWINGS

FIG. 3 illustrates an example of results data from a Detail Assessment survey;

FIG. 4 illustrates an example of normative results from detail piece drill-down questions;

DETAILED DESCRIPTION

Figure 1:
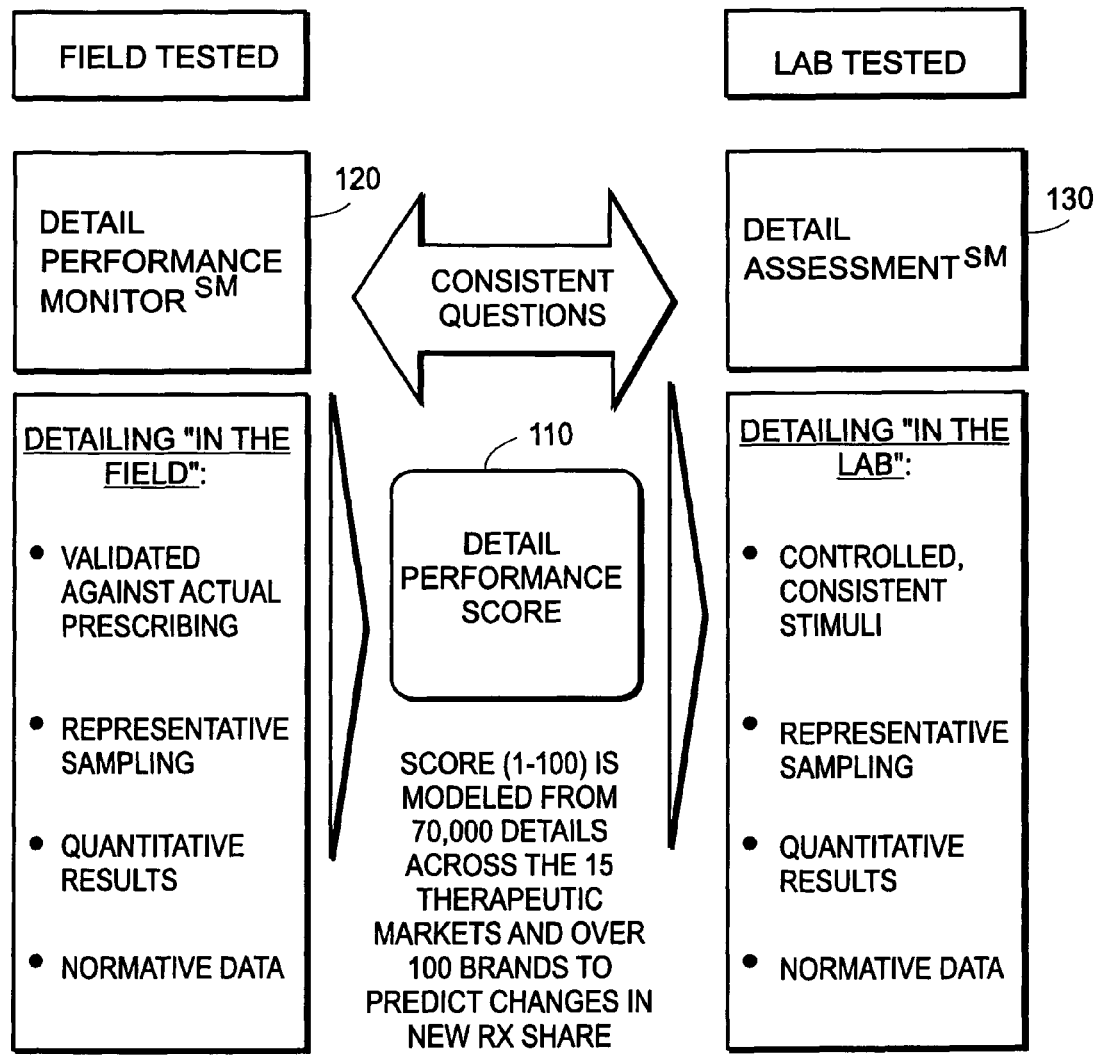
FIG. 1 illustrates a method of calculating a Detail Performance Score according to the present invention.

Embodiments of the invention include, separately or both in combination, two types of research surveys: a large, routinely fielded survey, referred to herein as the Detail Performance Monitor$^{SM}$ survey, which assesses changes in respondent attitudes across disciplines, for example, therapeutic areas; and a smaller, ad-hoc survey, referred to herein as the Detail Assessment$^{SM}$ survey, which is run, for example, in parallel with the Detail Performance Monitor for a specific campaign. These two surveys may be utilized interdependently. The Detail Performance Monitor provides an in-depth understanding of the real-world impact of sales details on respondent consumer behavior, for example, prescribing behavior. The Detail Assessment uses these data obtained from the Detail Performance Monitor and applies them to, for example, an individual detail under consideration.

In one embodiment, for both the Detail Performance Monitor survey and the Detail Assessment survey, a group of respondents, for example, physicians, are randomly selected from some relevant pool, for example, the American Medical Administration physician list, or a list provided by a client. The respondents can cover a number of different areas of concern, for example, practice specialties in the case of physicians. Respondents are recruited by, for example, fax, email and/or other means to participate in web-based surveys via a website. A respondent who responds to the invitation may then visit the website to, for example, establish a new account or to visit a previously established personal page to check for survey opportunities. For new respondents, sufficient demographic data are gathered to allow verification of the respondent's identity and credentials, to include, for example, the respondent's particular discipline and other data used to build a representative sample. If a respondent has been recruited for a survey and logs on to his personal page within the allotted timeframe and while sufficient slots for the survey exist, he will see, for example, a link to the survey. A respondent may agree to take one or more Detail Performance Monitor surveys.

The surveys themselves can be offered to respondents in specific locations, such as a conference room, or preferably in remote locations via, for example, one or more web servers or other types of networks. The number of respondents should be on the order of thousands or more qualified respondents, who respond to the surveys contemporaneously. A mixture of, for example, Java, XML, HTML and Oracle database processes are employed to customize the survey for the respondents, perform validation on the responses, store the results data and trigger the fulfillment process.

In contrast to the customization mentioned with respect to prior art survey processes, the customization referred to here merely renders a subgroup of the larger group of respondents, who may only be concerned with particular aspects of the more general survey. This customization allows the survey to retain comparability with respect to the respondent pool as a whole.

1) Detail Performance Monitor

The Detail Performance Monitor survey is a periodic (e.g. monthly) survey of market activities and respondent attitudes across various disciplines. For example, the survey may be administered monthly to physicians across, for example, fifteen or more therapeutic areas, completed by, for example, 1500 physicians. The Detail Performance Monitor survey has discrete groups of questions—or modules—that each form individual research topics. As will be described later in more detail, the module that contributes to the Detail Assessment invention is the Detailing Module.

After successfully logging onto the website and clicking on the survey link, respondents answer a series of screening questions to determine which research modules they should receive for which disciplines. For a cardiologist, for example, this might involve access to hypertension and angina market surveys while their psychiatric peers might see surveys related only to depression treatment. Transparent to each respondent, aspects of their survey are thus conformed to their discipline. As discussed previously, this limited customization makes the survey relevant to each respondent, however, care is taken to preserve the core consistency of the survey instrument.

Beyond selection of disciplines, another screening question determines if the respondent has received a sales call for products of interest, such as pharmaceuticals, within a certain time period, for example, the past 7-30 days. This retrospective approach enforces a double-blind approach to the sales call: the respondent does not know which products will be asked about and the researcher does not know which products the respondent has seen.

Respondents are not induced to report only on the activities of selected representatives prior to the sales call. Such preparation could introduce a subtle bias into a respondent's approach to the detail: specific details are now renumerative, and as such, are no longer part of the respondent's normal environment. In response, the respondent is likely to be more interested in the interaction for the specific product than normal, and is more likely to cite awareness of the product, retain key messages, etc. As a result, such pre-preparation imparts a bias to survey results that make them less representative of how the detail will actually be received in the marketplace when no inducement is offered.

In the Detail Performance Monitor, respondents complete a questionnaire battery for sales calls they have received within, for example, the past 7 days. These questions ask respondents to evaluate an actual product detail given by a representative across a number of call dynamics, to include, for example: the type of call (scheduled appointment, lunch, dinner meeting, professional conference, etc.); messages recalled from the presentation; ratings of effectiveness of the detail; reporting of competitive product mentions and messages; and/or intent to change behavior on the basis of the interaction.

Responses from this study are routinely compared to the ensuing respondent consumer behavior of the survey respondents. In the case of marketing research in the pharmaceutical industry, the respondent consumer behavior would be physician prescribing behavior. These prescribing data are collected at pharmacies and then cleaned, aggregated and sold by a variety of vendors. Some of these vendors claim greater than 95% capture of prescriptions filled in retail pharmacies nationwide; others capture a smaller but representative data set. Prescribing data are available at the individual physician level, and each physician is identified by one of several unique physician identifiers extant in the industry. By collecting these same unique identifying data at registration or via demographic questions, attitudinal data from survey research may be linked with the same physician's exact prescribing pattern at the same time point. This comparison results in a wealth of data available for statistical processing and the production of predictive models. The actual modeling and other analytic processes can be performed in a wide variety of statistical and database software packages.

Following a deployment of the Detail Performance Monitor survey, pooled regression is performed against the survey responses and subsequent behavioral data to correlate the pattern of respondent attitudes, beliefs and self-reported respondent consumer behaviors that best forecast discrete respondent consumer behaviors. This statistical processing identifies the question/response pairs that are most predictive of future respondent consumer behavior, and produces a weighting of the contribution of each to the strength of the prediction. This weight, or coefficient, is, for example, the mathematical share of relative contribution of each attribute to the total behavior under study and underpins the predictive model. Based on subsequent waves of this routine collection of attitudinal and behavioral data, these predictive models can be continually monitored and readjusted as needed to adjust to changes in attitudes, beliefs, behavioral patterns and their interrelationships. Providing methodologic factors are properly controlled, the same question asked in a separate study can share these coefficients to model respondent consumer behavior from response data.

The Detail Performance Monitor survey comprises "in the field" responses to the research question: "how are consumers responding to current campaigns in the marketplace?" When these same questions are asked again in a subsequent study, the new survey responses can be weighted with these same coefficients and benefit from the same predictive model of how those responses will ultimately affect respondent consumer behavior. This process of comparing a subset of results against historical data produced by the same research instrument over time and in various circumstances is described as a "normative" dataset, as it purports to represent a "normal"

distribution of responses. A research instrument describes a combination of survey questions, survey logic, flow, sample size, and certain other aspects of methodology that can be expected to produce comparable results in separate deployments.

With continued accumulation of similar data points, better confidence can be obtained to corroborate these findings, and researchers can explore many more paths of inquiry around how consumers, for example, physicians, will respond to marketing efforts. Some, more subtle findings may become apparent, for example, only after an extraordinary number of data points are collected and the experiment reaches sufficient power. At root, however, is the creation and analysis of a large, carefully controlled dataset of survey response and behavioral data. From this basis, a number of innovative data products may be created.

One such feature, according to one or more embodiments of the present invention, is a statistical model derived from the Detail Performance Monitor data, referred to herein as the Detail Performance Score, or DPS. FIG. 1 illustrates a method for calculating the DPS, as defined by one or more embodiments of the present invention. DPS 110 represents the overall ability of the detail for the profiled product to influence respondent consumer behavior, for example, physicians' prescribing behavior. The DPS ranges, for example, from 1 to 100, where a score of 1 may indicate that all of the product's details fail to influence, for example, in a medical marketing scenario, any physicians to prescribe the detailed product.

DPS 110 is modeled, for example, from Detail Performance Monitor survey 120 results that represent a large number, for example, on the order of tens of thousands of historical details across a variety of disciplines, for example, fifteen therapeutic areas, and over a various sample of products, such as, 100 products. The DPS 110 is developed, according to one or more embodiments of the present invention, from a weighted combination of individual components of the detail, where the weights for each individual component are determined by the relative importance of the detail component to, for example, the physician's prescribing decision. These components are comprised of selected question/response pairs with known contribution to a consumer behavior, a process explained above. It should be noted that other methods of calculating the DPS are also possible according to one or more embodiments of the present invention.

Another feature, according to one or more embodiments of the present invention, is a metric that compares the calculated DPS of the profiled product's details to an expected DPS, given the profiled product's lifecycle. This metric is referred to herein as the Lifecycle Performance Index, or LPI. These lifecycle stages may be described as, for example: 0-3 months—launch, awareness and trial; 4-6 months—launch and adoption; 7-12 months—growth, phase 1; 13-18 months—growth, phase 2; and 19 or more months—mature.

Consumers are typically more interested in new products, and their interest in receiving additional information declines as they gain experience with the product or as the product ages. In the pharmaceutical industry, for example, for all products across all treatment areas, DPS scores tend to follow a similar descending curve as they move further away from launch. An expected DPS is estimated by, for example, fitting this curve; the data are then normalized to a baseline of, for example, 100 to represent the intersection of expected score at point in lifecycle. Other methods of estimating the estimated DPS are possible according to one or more embodiments of the present invention.

The expected DPS—the score typically expected of a product of like lifecycle stage—is compared to the actual DPS to produce a lifecycle-adjusted measure of variance from the expected norm. This variance is then computed through statistical processing to produce a lifecycle-normalized score used to further evaluate sales performance. This score is the LPI. A LPI above 100 indicates, for example, that the profiled product's details are more effective than expected given the length of time since the profiled product's launch. A LPI below 100 indicates, for example, that the profiled product's details are more effective than expected given the length of time since the profiled product's launch.

Another such feature, according to one or more embodiments of the present invention, is a statistical model derived from the Detail Performance Monitor data, referred to herein as the Regional Performance Score, or RPS. Whereas the DPS is a model to predict effectiveness at the national, or census, level, the RPS model calculates the DPS from data collected from autonomous geographic regions and provides a measure of regional variation in receptivity to the detail.

Using a similar method as previously delineated for calculation of the DPS, researchers evaluate the value of this score versus the national DPS. For example, a score of 50 on this measure is considered an average score, while a score of 100 is the highest attainable and 1 is the lowest.

By comparing this score at regional levels across the nation, marketers can hone their materials and presentations to achieve optimal results despite regional variability in acceptance and response. As an example, in the case where a detail earns a RPS of 40 in the Northeast and 70 in the Southeast, a marketer might commission additional research to fully understand the dynamics that result in this disparity. On the basis of this understanding, they might further tailor their materials and presentations used with customers in the Southeast to more effectively influence the desired respondent consumer behaviors. They could then continue to use the RPS generated for subsequent DPMs to track progress against this goal.

This regionalization divides the total sample by as many regions as are included in the segmentation. The DPM may not achieve sufficient sample size during each DPM fielding to express significant differences among populations. As a result, the RPS is calculated as the average of the prior three months regional DPS in order to achieve a sufficient quantity of observations per region.

Another such feature, according to one or more embodiments of the present invention, is a statistical model derived from the Detail Performance Monitor data, referred to herein as the Message Performance Score, of MPS. This model tests one or discrete marketing messages for predicted impact on respondent consumer behavior. In the pharmaceutical market, the MPS predicts the impact on physician prescribing behavior.

The detail has one or more messages that are designed to present to the physician the benefits of the detailed product. These messages may have a visual component, e.g., graphics, text, photos, graphs, and/or other visual materials. These messages may also have an audio component, e.g., an audio voiceover, music, and/or other types of audio. The ability to influence physician prescribing decisions varies by message. The Message Performance Score presents a performance score for each message that indicates the ability of that message to influence physicians to prescribe the detailed product.

Similar to calculation of the DPS, selected question/response pairs—this time surrounding specific marketing messages—are analyzed against respondent consumer behavioral data to determine which messages produce the greatest change in respondent consumer behavior. Messages are then scored, for example, on a 1-100 scale, where a score of 1 indicates no effect of the message on changes in respondent consumer behavior.

This subdivision of the group by message divides the total sample by as many messages as are included in the segmentation. The DPM may not achieve sufficient sample size during each DPM fielding to express significant differences in MPS among populations. As a result, the MPS is calculated as the average of the prior two months responses in order to achieve a sufficient quantity of observations per region.

Detail Assessment Survey

According to one or more embodiments of the present invention, in order to evaluate a specific detail under consideration, a Detail Assessment survey is conducted. The Detail Assessment survey serves as an "in the lab" complement to the "in the field" Detail Performance Monitor. In this survey, responses at a particular time point can be compared to historical responses to the same question to provide a measure of "skew" from the mean, historical response.

The Detail Assessment survey is a standardized research instrument designed to simulate, for example, the sales representative/respondent detail experience. A sequence of research questions and multimedia presentations, for example, are exposed to the respondent in a controlled fashion over, for example, the Internet or some other wide area network ("WAN"). Because this survey shares standard research questions or modules with the Detail Performance Monitor, survey results from the Detail Performance Monitor may be used with the same predictive prescribing model to forecast respondent consumer behavior.

In the Detail Assessment, respondents are recruited by, for example, fax and/or email to participate in a survey over the Internet that last for a certain period of time, for example, 30-45 minutes. By conducting the survey over the Internet (or other WAN), respondents can take the survey at home or office conveniently, and a geographically dispersed sample is obtained.

The sample size of the survey is modeled, for example, by comparing the research instrument, the number and subgroups in the population and the desired resolving power to detect differences in responses. Respondents who qualify for the study see, for example, a link on their Welcome page, and may click this link to initiate the Detail Assessment survey. Respondents then participate in a series of questions designed to evaluate their response to a representative detail. These questions are divided into discrete, standardized modules and include, for example: the Pre-Stimulus Questions, the Full Detail Exposure, the Post-Stimulus Questions, an optional Counter Detail and the Detail Piece Drill Down.

Figure 2:
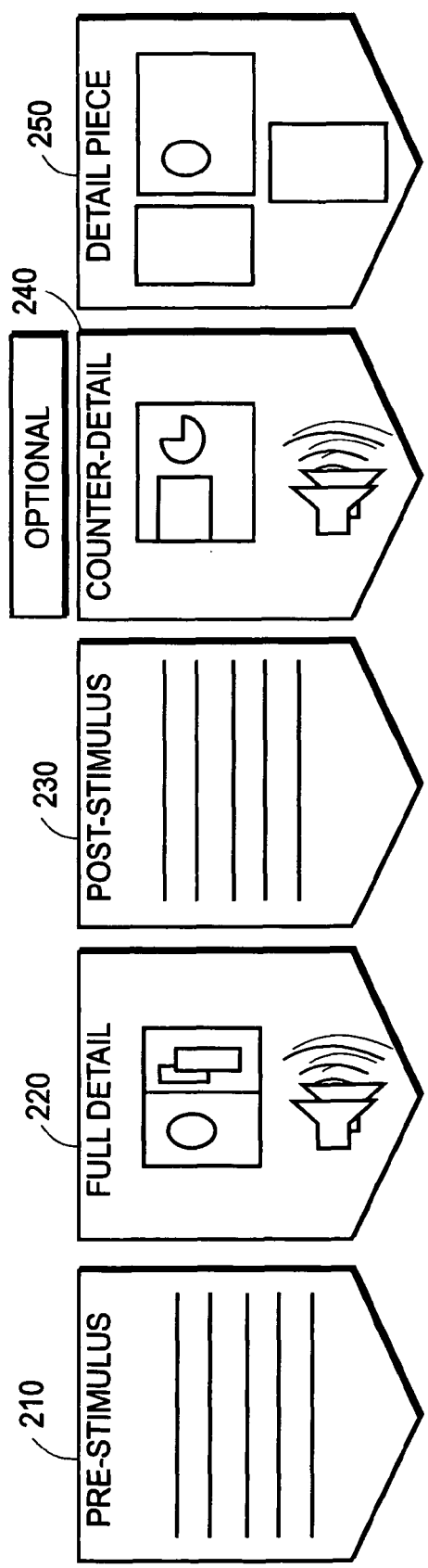
FIG. 2 illustrates a methodology of conducting a Detail Assessment survey according to the present invention.

FIG. 2 illustrates a methodology of conducting a Detail Assessment survey, according to one or more embodiments of the present invention. The modules of the Detail Assessment survey include, for example: Pre-Stimulus module 210; Full Detail module 220; Post Stimulus module 230; optional Counter-Detail module 240; and Detail Piece module 250. It should be noted that the modules represented in FIG. 2 and described below may be presented to respondents in any number of sequences and is not limited to the particular sequence illustrated and described.

In the first module, referred to herein as Pre-Stimulus Questions module 210, respondents answer questions about their particular area of interest, for example, in the case of physicians, the questions may pertain to their practice and include, for example, the volume of patients, the density of specific patient types and a self-reported estimate of their prescribing behavior.

In the second module, referred to herein as Full Detail Exposure 220, respondents are exposed to a full detail via, for example, a proprietary multimedia presentation. Technology may be used to present the multimedia presentation that allows visual images to be synchronized with, for example, an audio voiceover. In one or more embodiments of the present invention, this technology is optimized for transmission of multimedia presentations over a 28.8 kbps dial-up link as well as for broadband users. Images may be, for example, scanned pictures of the proposed promotional material, rendered as, for example, .gif, .jpeg, .pdf, or HTML images to be shown over, for example, a web browser. A representative sales pitch may be recorded and synchronized with the images. Once created, these multimedia presentations can be offered at any point in the survey. They can also be emailed and presented as a link.

In one or more embodiments of the present invention, the multimedia presentations are presented in a continuous flow of information elements displayed through the web browser. Respondents will answer questions, see a multimedia presentation, answer more questions, etc. These survey and multimedia components can be packaged in any number of novel ways to support a research exercise. For example, the multimedia technology employed may allow respondents to view and pause the presentation, and the respondent may be prevented from reversing or fast-forwarding the presentation. In this way, researchers gain greater assurance that the respondent will see the stimulus in the way it was designed, with the only concession to real-world conditions that of a pause for the invariable bathroom break, phone call or other event that takes the respondent away from his or her computer. The technology further allows, for example, the ability for respondents to view a page and then drill into a portion of the page for greater clarity.

When a Detail Assessment survey involves the testing of multiple details, according to one or more embodiments of the present invention, the sample may be increased proportionally so that each respondent views, for example, a single presentation once, and their results are then compared. This "monadic design" removes the bias produced by respondent learning as a result of viewing multiple presentations.

Following the presentation of Full Detail module 220, respondents move to a third module, Post-Stimulus Questions module 230, where they are asked a variety of standardized questions to assess the impact of the detail. These questions may mirror the pre-exposure questions, and as such include, for example, a number of normative questions reflecting the effectiveness of the detail—questions that have historical data correlates that are used in reporting or forecasting. FIG. 3 illustrates an example of results provided to assess changes in prescribing associated with viewing the detail.

Many of the same questions used in the Detail Assessment survey may also be asked in conjunction with the Detail Performance Monitor survey. These shared questions provide a consistent linkage with which to correlate the findings of the mock detail tested "in the lab," using the Detail Assessment survey, with the results of details recalled from "in the field," using the Detail Performance Monitor survey. It is to the results of these shared questions that the coefficients that predict future prescribing behavior are applied. It is in this manner that the Detail Assessment survey about the detail at hand uses previously collected data to predict respondent consumer behavior, for example, future prescribing behavior as a result of the proposed detail, according to one or more embodiments of the present invention. By varying the components and delivery of the detail, marketers can thus "tune" the detail to achieve the largest predicted impact on prescribing. For example, for a particular detail, results of the Detail Assessment survey may indicate that the graphics component of the detail score below expectations. The graphics could, thus, be "tuned" to remedy any defects or weaknesses. It should be noted that other methods of using previously collected data to predict future respondent consumer behavior are also possible according to one or more embodiments of the present invention.

A fourth module of the survey is an optional module, referred to herein as Counter Detail module 240, whereby one or more simulated competitive responses—also shown, for example, via multimedia graphics with or without streaming audio. Respondents are asked a series of questions to ascertain if the counter detail affected their responses. These findings provide the marketer with an assessment, for example, of the durability of the sales pitch when exposed to criticism. Normative questions asked in the counter detail module focus on reassessment of the original detail, again providing opportunities for cross-time, cross-therapeutic area analysis of the impact of counter detail campaigns on a marketing campaign.

After viewing the detail and counter detail (if included) the respondent is exposed to a fifth module of the survey, referred to herein as Detail Piece Drill Down module 250. Here, the respondent is asked a series of in-depth normative drill-down questions about the promotional materials. These normative drill-down questions provide insight into, for example, how the materials should be physically produced to achieve a desired affect. Other normative data may be gathered to assess the respondents' emotional responses to the detail and to evaluate, for example, the creative and graphical content of the promotional materials.

Respondents also are asked about elements of stopping and staying power, for example, does the detail capture the attention, pique interest, summarize pertinent information, leave a lasting impression, and is it relevant to the respondent's discipline. Each question is asked, for example, consistently over time, thus continuing to contribute to the normative dataset of historical responses to detailing.

In one or more embodiments of the present invention, results of the Detailed Assessment survey are tabulated and standard statistical measures of difference are performed. FIG. 4 illustrates an example of a representative results set from a Detail Piece Drill Down. These analyses are performed in a variety of tools available from a variety of vendors, for example, SAS software, SPSS Inc. software, Wincross software from The Analytic Group, Inc., and other statistical analysis and reporting software packages. These results are analyzed and built into a report for the sponsor of the research. These reports may take the form of, for example, a graphical presentation of the data and may include, for example, cross-tabular data tables that show the data with statistical testing applied. The report explains the methodology, the findings, the implications for the marketer, and recommendations on next steps in improving the marketing process.

The results provide, for example, a summary of how the respondent's impressions change in response to the detail. These impressions may be compared at the outset of the Detail Assessment survey process, after viewing the presentation(s), and at the end of the Detail Assessment survey process. This provides a means, according to one or more embodiments of the present invention, of determining how the detail itself—and counter detail, if so included—contributes to changes in respondent attitudes and beliefs surrounding the product. These results may also be calculated among subgroups—as an example, primary care physicians versus specialists—and against the normative results values seen to date. The researcher can select the normative dataset from, for example, across all markets, within a selected market over time, within a particular company or product, etc. It should be noted that other methods of analysis of the Detail Assessment survey are possible according to one or more embodiments of the present invention.

Another finding provided by an embodiment of the present invention is, for example, the predictive modeling of future respondent consumer behavior. By using shared questions and methodologies, researchers can apply the same correlation coefficients used in the empiric Detail Performance Monitor to the Detail Assessment to develop a model for how the detail at hand can be expected to affect future respondent consumer behavior.

Specifically, a specific Detail Assessment survey is conducted to test marketing materials relating to, for example, one product. Separately, the same questions from the specific Detail Assessment survey may be asked about, for example, all products within the same market using the Detail Performance Monitor survey. The Detail Assessment survey may be administered to a group of respondents that is distinct from the group of respondents used in the Detail Performance Monitor survey, although there may be some overlap between the groups of respondents. The results of each study may be analyzed to produce DPS scores. These DPS scores are then compared to evaluate how well the detail "in the lab," tested using the Detail Assessment survey, would be expected to perform "in the field," as tested using the Detail Performance Monitor survey. A Detail Assessment-based DPS score that is higher than the market average represented by the Detail Performance Monitor-based DPS score would tell the marketer that their approach is superior to those currently in the marketplace. In order to account for differences in lifecycle, each product-specific DPS may be subsequently run through a stage of lifecycle adjustment to produce the LPI scores for each product. As with the DPS, these LPIs then may be evaluated to further hone the predictive-impact model.

These models, among others, provide clear, simple metrics that allow a summarized assessment of propensity to change behavior. In this way, responses to details as produced according to one or more embodiments of the present invention may serve as a leading indicator for future prescribing behaviors, and marketers can start to react weeks or months ahead of receipt of the corroborating prescribing data.

The Detail Performance Monitor and the Detail Assessment impart a substantial competitive advantage to the marketer by placing them in a proactive position to influence market share. When compared to competitors who have to wait until the prescribing behavior are available and then hypothesize the effects of a current campaign on those behaviors, the Detail Assessment user can gain advantage in speed, accuracy and momentum. When compared to the marketer who uses only qualitative data in their testing, the Detail Assessment user can gain advantage in knowing exactly which elements contribute to or detract from a desired effect, and reap improved productivity among team members by reducing testing-related travel.

As each subsequent deployment adds to the power of the normative detailing data set, the marketer using the Detail Assessment solution can expect their results and predictions to improve in accuracy and predictability over time. Ultimately, the same marketer, who learns from and applies the findings obtained from these surveys and methods, can expect to enjoy improvements in market share and usage as a result.

Figure 5:
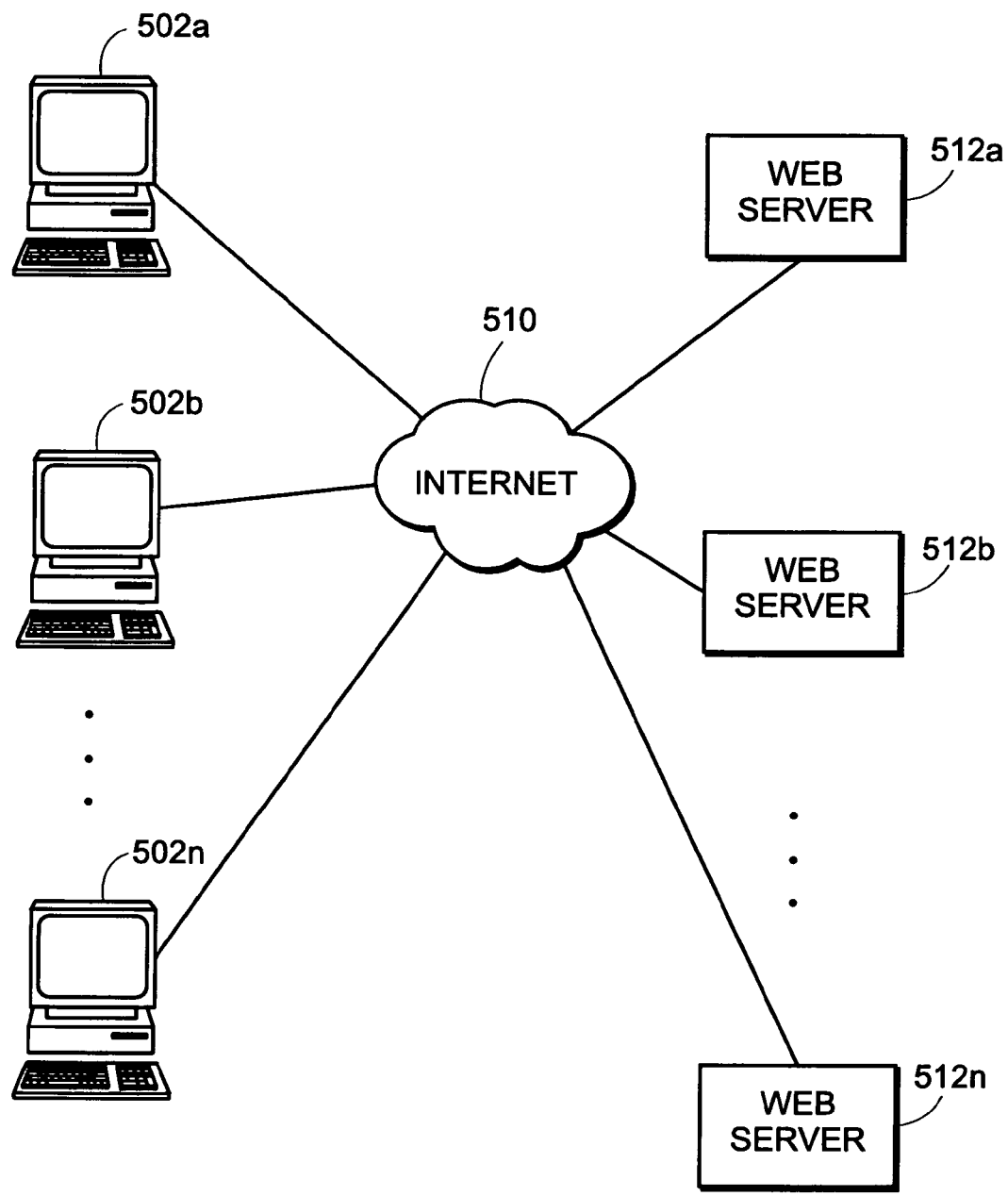
FIG. 5 illustrates a network enabling operation of the present invention.

FIG. 5 illustrates an example of a network over which the present invention may be implemented. As described previously, the Detail Performance Monitor survey and the Detail Assessment survey may be presented to one or more respondents over a wide area network ("WAN"), for example, the Internet 510. A respondent, for example, a physician, accesses one or more web server(s) 512*a-n* through various user terminals, shown as user terminals 502*a-n*. Web server(s) 512 may host and administer the Detail Performance Monitor survey and/or the Detail Assessment survey to the respondent(s), as described above.

Figure 6:
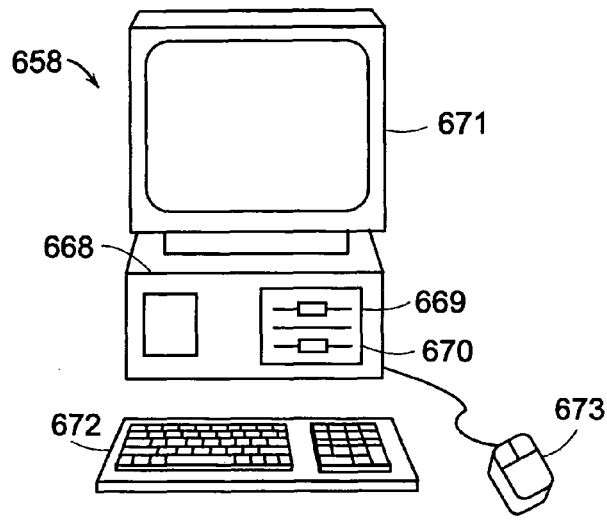
FIG. 6 is an illustration of a computer used for implementing the computer processing in accordance with a computer-implemented embodiment of the present invention.

Various aspects of the present invention that can be controlled by a computer can be (and/or be controlled by) any number of control/computer entities, including the one shown in FIG. 6. FIG. 6 is an illustration of a computer 658 used as a respondent user terminal in accordance one or more embodiments of the present invention. The procedures described above may be presented in terms of program procedures executed on, for example, a computer or network of such computers, or user terminals.

Viewed externally in FIG. 6, computer 658 has a central processing unit (CPU) 668 having disk drives 669, 670 or other such devices that may accommodate removable media such as floppy disks, CD ROMs, digital video disks, etc.

Computer 658 also has a display 671 upon which information may be displayed. A keyboard 672 and/or a pointing device 673, such as a mouse 673, may be provided as input devices to interface with central processing unit 668. The pointing device 673 may be a mouse, touch pad control device, track ball device, or any other type of pointing device.

Figure 7:
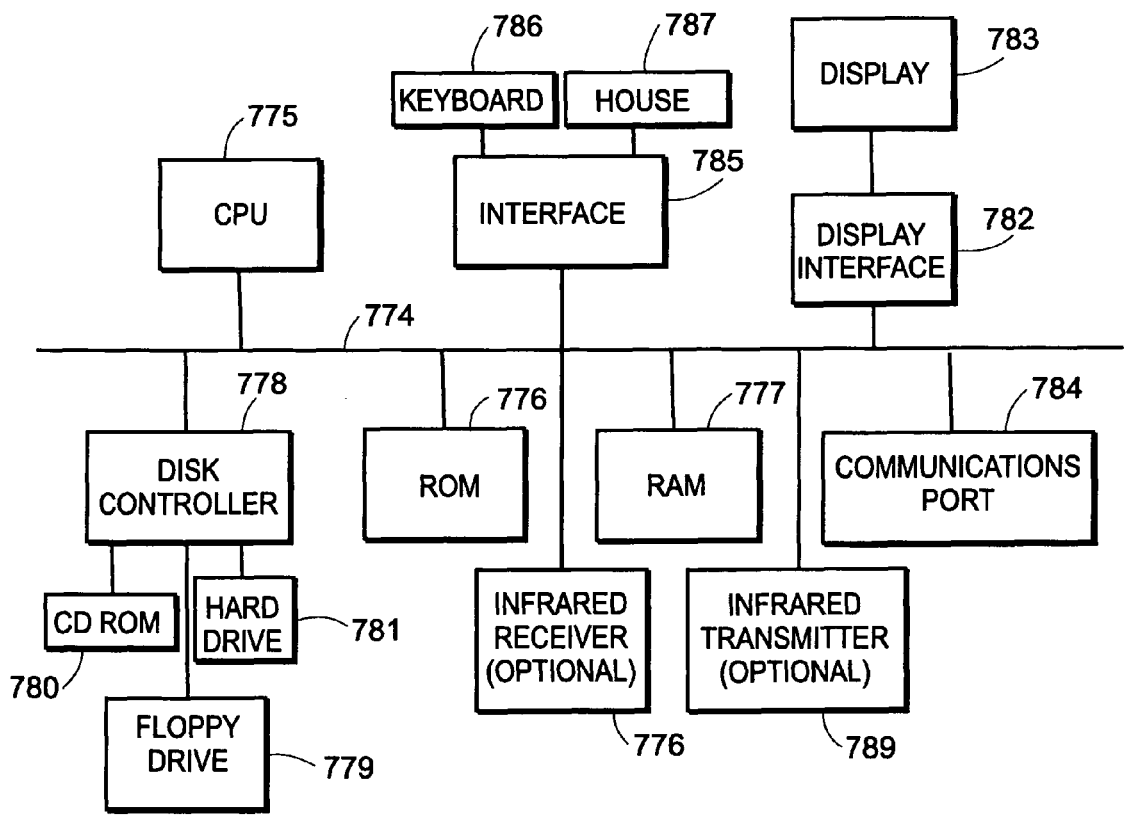
FIG. 7 illustrates a block diagram of the internal hardware of a computer for use as a user terminal according to the present invention.

FIG. 7 illustrates a block diagram of the internal hardware of the computer of FIG. 6. CPU 775 is the central processing unit of the system, performing calculations and logic operations required to execute a program, such as accepting respondent input to survey questions. Read only memory (ROM) 776 and random access memory (RAM) 777 constitute the main memory of the computer. Disk controller 778 interfaces one or more disk drives to the system bus 774. These disk drives may be floppy disk drives such as 779, or CD ROM or DVD (digital video/versatile disk) drives, as at 780, or internal or external hard drives 781. As previously indicated these various disk drives and disk controllers are optional devices.

A display interface 782 permits information from bus 74 to be displayed on the display 783. In addition to the standard components of the computer, the computer may also include an interface 785, which allows for data input through the keyboard 786 or pointing device, such as a mouse 787.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the user may interact with the system via e.g., a personal computer or over PDA, e.g., the Internet, an Intranet, etc. Either of these may be implemented as a distributed computer system rather than a single computer. Similarly, the communications link may be a dedicated link, a modem over a POTS line, and/or any other method of communicating between computers and/or users. The user interfaces may be developed in connection with an HTML display format. Although HTML is utilized in the illustrated examples, it is possible to utilize alternative technology for displaying information, obtaining user instructions and for providing user interfaces. The invention has been discussed in connection with particular examples. However, the principles apply equally to other examples and/or realizations. Naturally, the relevant data may differ, as appropriate.

The system used in connection with the invention may rely on the integration of various components including, as appropriate and/or if desired, hardware and software servers, database engines, and/or other content providers. The configuration may be, preferably, network-based and uses the Internet as a primary interface with the user.

The system according to one or more embodiments of the invention may store collected information and/or indexes to information in a database. An appropriate database may be on a standard server, for example, a small Sun™ Sparc™ server, or other remote location. The information may, for example, optionally be stored on a platform that may, for example, be UNIX-based. The various databases maybe in, for example, a UNIX format, but other standard data formats may be used.

The system on the server side according to one or more embodiments of the invention is optionally suitably equipped with a one or a combination of processors or storage devices. For example, the computer may be replaced by, or combined with, any suitable processing system operative in accordance with the principles of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on floppy disk, provided on CD ROM, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an interpretive environment such as Java and transported to multiple destinations to various users.

Although various embodiments that incorporate the teachings of the present invention have been shown and described in detail herein, those skilled in the art can readily devise many other varied embodiments that incorporate these teachings.

The many features and advantages of the invention are apparent from the detailed specification, and thus, it is intended by the appended claims to cover all such features and advantages of the invention, which fall within the true spirit and scope of the invention. Further, since numerous modifications and variations will readily occur to those skilled in the art, it is not desired to limit the invention to the exact construction illustrated and described, and accordingly, all suitable modifications and equivalence may be resorted to, falling within the scope of the invention. For example, although particular reference is made with regard to the use of embodiments of the present invention with regard to marketing strategies in the pharmaceutical industry, it should be noted that the present invention is not limited to this use and may be applied to any area in which marketing strategies are utilized and, thus, are desired to be evaluated.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

What is claimed is:

1. A method for analyzing the effectiveness of marketing strategies for various competing products in a market, the method comprising:
    administering a first survey relative to marketing materials that have multiple components for several of the various competing products, wherein first survey results are provided by a first group of respondents in a target industry corresponding to the market;
    tracking subsequent behavioral data of the first group of respondents;
    determining, based on the first survey results and the subsequent behavioral data, which components of the marketing materials for the several of the various competing products most significantly effect subsequent respondent behavior;
    creating on a computer a first statistical model based on the first survey results, wherein the first statistical model represents an overall ability of the marketing materials for the several of the various competing products to influence respondent behavior;
    administering a second survey to a second group of respondents for at least one competing product of the various competing products that is different from the several of the various competing products analyzed in the first survey, wherein the second survey consists of at least one module and wherein the second group of respondents provide second survey results in response to at least one marketing sample;
    determining respondent attitude of the second group of respondents to the at least one competing product before said second group of respondents are exposed to the at least one marketing sample;
    tabulating on a computer the second survey results of the at least one module;
    determining what effect the at least one marketing sample had on respondent attitude of the second group of respondents regarding the at least one competing product of the various competing products;
    determining how the at least one marketing sample can be expected to affect future behavior of the respondents;
    creating on a computer a second statistical model based on the second survey results, wherein the second statistical model represents an overall ability of the marketing materials for the at least one competing product of the various competing products to influence respondent behavior; and
    comparing the first statistical model to the second statistical model, wherein the comparison indicates the effectiveness of the marketing materials for the at least one competing product with respect to the marketing materials for the several of the various competing products.

2. The method of claim 1, wherein the first group of respondents and the second group of respondents have overlapping members.

3. The method of claim 1, wherein the first statistical model is represented by a score.

4. The method of claim 3, wherein the score ranges from 1 to 100, wherein a score of 1 represents a failure of the marketing materials of the several of the various competing products to influence respondent's behavior.

5. The method of claim 1, further comprising creating an index, wherein the index represents a comparison of the first statistical model of the marketing materials for the several of the various competing products to an expected statistical model based on the lifecycle of the several of the various competing products.

6. The method of claim 5, wherein the index is normalized to a baseline such that an index above the baseline indicates that the marketing materials for the several of the various competing products is more effective than expected given the several of the various competing products' time on the market.

7. The method of claim 1, wherein the second statistical model is represented by a score.

8. The method of claim 7, wherein the score ranges from 1 to 100, wherein a score of 1 represents a failure of the marketing materials of the at least one competing product of the various competing products to influence respondent's behavior.

9. The method of claim 1, further comprising creating an index, wherein the index represents a comparison of the second statistical model of the marketing materials for the at least one product competing product of the various competing products to an expected statistical model based on the at least one competing product's lifecycle.

10. The method of claim 9, wherein the index is normalized to a baseline such that an index above the baseline indicates that the marketing materials for the at least one competing product is more effective than expected given the at least one competing product's time on the market.

11. The method of claim 1, wherein the step of determining which components of the marketing materials most significantly affected subsequent respondent behavior comprises employing statistical processing against the survey results and the subsequent behavioral data.

12. The method of claim 11, wherein the statistical processing comprises pooled regression.

13. The method of claim 1, wherein the marketing strategy is a marketing presentation, which comprises at least one of a visual component and a verbal component.

14. The method of claim 1, wherein the marketing presentation is a pharmaceutical detail and the respondents comprise physicians.

15. The method of claim 14, wherein the subsequent behavioral data comprises subsequent pharmaceutical prescribing behavior of the respondent physicians.

16. The method of claim 1, wherein the components of the marketing materials include visual material and audio.

17. The method of claim 1, wherein the at least one marketing sample includes visual material and audio.

18. A method for analyzing the effectiveness of marketing strategies for various competing products in a market, the method comprising steps of:
    administering a first survey relative to marketing materials that have multiple components for several competing products, wherein first survey results are provided by a first group of respondents in a target industry corresponding to the market;
    administering a second survey, different from the first, to a second group of respondents, non-identical to the first group of respondents, for at least one competing product of the various competing products analyzed in the first survey, wherein the second survey consists of at least one module and wherein the second group of respondents provides second survey results in response to at least one marketing sample;
    determining on a computer, based on a comparison of the first survey results and the second survey results, the effectiveness of the marketing materials for the at least one competing product with respect to the marketing materials for the several of the various competing products;

tracking subsequent behavioral data of the first group of respondents;

determining, based on the first survey results and the subsequent behavioral data, which components of the marketing materials for the several of the various competing products most significantly effect subsequent respondent behavior; and creating on a computer, a statistical model based on the first survey results, wherein the statistical model represents an overall ability of the marketing materials for the several of the various competing products to influence respondent behavior; and creating an index, wherein the index represents a comparison of the statistical model of the marketing materials for the several of the various competing products to an expected statistical model based on the lifecycle of the several of the various competing products.

19. The method of claim 18, wherein the index is normalized to a baseline such that an index above the baseline indicates that the marketing materials for the several of the various competing products is more effective than expected given the several of the various competing products' time on the market.

20. A method for analyzing the effectiveness of marketing strategies for various competing products in a market, the method comprising steps of:

administering a first survey relative to marketing materials that have multiple components for several competing products, wherein first survey results are provided by a first group of respondents in a target industry corresponding to the market;

administering a second survey, different from the first, to a second group of respondents, non-identical to the first group of respondents, for at least one competing product of the various competing products analyzed in the first survey, wherein the second survey consists of at least one module and wherein the second group of respondents provides second survey results in response to at least one marketing sample; and determining on a computer, based on a comparison of the first survey results and the second survey results, the effectiveness of the marketing materials for the at least one competing product with respect to the marketing materials for the several of the various competing products;

determining respondent attitude of the second group of respondents to the at least one competing product before the first group of respondents are exposed to the at least one marketing materials;

tabulating on a computer the second survey results of the at least one module;

determining what affect the at least one marketing sample had on respondent attitude of the second group of respondents regarding the at least one competing product of the various competing products;

determining how the at least one marketing sample can be expected to affect future behavior of the second group of respondents; and creating, on a computer, a statistical model based on the second survey results, wherein the second statistical model represents an overall ability of the marketing materials for the at least one competing product of the various competing products to influence respondent behavior.

21. The method of claim 20, wherein the statistical model is represented by a score.

22. The method of claim 21, wherein the score ranges from 1 to 100, wherein a score of 1 represents a failure of the marketing materials of the at least one competing product of the various competing products to influence respondent's behavior.

23. The method of claim 21, further comprising creating an index, wherein the index represents a comparison of the statistical model of the marketing materials for the at least one product competing product of the various competing products to an expected statistical model based on the at least one competing product's lifecycle.

24. The method of claim 23, wherein the index is normalized to a baseline such that an index above the baseline indicates that the marketing materials for the at least one competing product is more effective than expected given the at least one competing product's time on the market.

* * * * *